United States Patent [19]

Drawert et al.

[11] 4,426,210
[45] Jan. 17, 1984

[54] PROCESS FOR ELIMINATING ODOR-EMITTING SUBSTANCES FROM WASTE AIR

[75] Inventors: Friedrich Drawert, Freising; Peter Schreier, Würzburg; Gabriele Krämer, Nuremberg, all of Fed. Rep. of Germany

[73] Assignee: Anton Steinecker Maschinenfabrik GmbH, Freising, Fed. Rep. of Germany

[21] Appl. No.: 254,490

[22] Filed: Apr. 15, 1981

[30] Foreign Application Priority Data

Apr. 19, 1980 [DE] Fed. Rep. of Germany ....... 3015220

[51] Int. Cl.³ ............................................ B01D 47/14
[52] U.S. Cl. ........................................... 55/73; 55/80; 55/87; 55/222
[58] Field of Search ................. 55/73, 80, 87, 90, 95, 55/222; 252/174.22, 541, 544

[56] References Cited

U.S. PATENT DOCUMENTS

| | | | |
|---|---|---|---|
| 2,637,701 | 5/1953 | Doerr | 252/174.22 |
| 2,781,863 | 2/1957 | Bloch et al. | 55/73 |
| 2,863,527 | 12/1958 | Herbert et al. | 55/73 |
| 2,926,754 | 3/1960 | Ragatz | 55/87 |
| 3,113,104 | 12/1963 | Bersworth | 252/544 |
| 3,346,489 | 10/1967 | Dickson et al. | 252/544 |
| 3,370,080 | 2/1968 | Bloch | 252/544 |
| 3,468,805 | 9/1969 | Grifo et al. | 252/541 |
| 3,726,062 | 4/1973 | Hungate et al. | 55/90 |
| 3,738,086 | 6/1973 | Bellisio et al. | 55/73 |
| 3,770,643 | 11/1973 | Heiba et al. | 252/544 |
| 3,936,281 | 2/1976 | Kurmeier | 55/73 |
| 3,959,154 | 5/1976 | Cox | 252/541 |
| 4,100,257 | 7/1978 | Sartori et al. | 55/73 |

FOREIGN PATENT DOCUMENTS

| | | | |
|---|---|---|---|
| 1942639 | 4/1971 | Fed. Rep. of Germany | 55/73 |
| 2451958 | 4/1975 | Fed. Rep. of Germany | 55/73 |
| 2534018 | 2/1977 | Fed. Rep. of Germany | 55/73 |
| 2804418 | 8/1978 | Fed. Rep. of Germany | 55/73 |
| 728444 | 4/1955 | United Kingdom | 55/73 |
| 944256 | 12/1963 | United Kingdom | 55/73 |
| 655410 | 4/1979 | U.S.S.R. | 55/73 |

OTHER PUBLICATIONS

Hackh's Chemical Dictionary, Fourth Edt., Copyright 1972, p. 333.

*Primary Examiner*—David L. Lacey
*Attorney, Agent, or Firm*—Learman & McCulloch

[57] ABSTRACT

The invention relates to a process for eliminating odor-emitting substances from the waste air of installations of various types, to this end, the waste air is purified by spraying in washing water which contains an addition of certain non-ionic compounds or certain ampholytic compounds or of mixtures of these compounds. In this way the odor-emitting substances are effectively eliminated.

5 Claims, 1 Drawing Figure

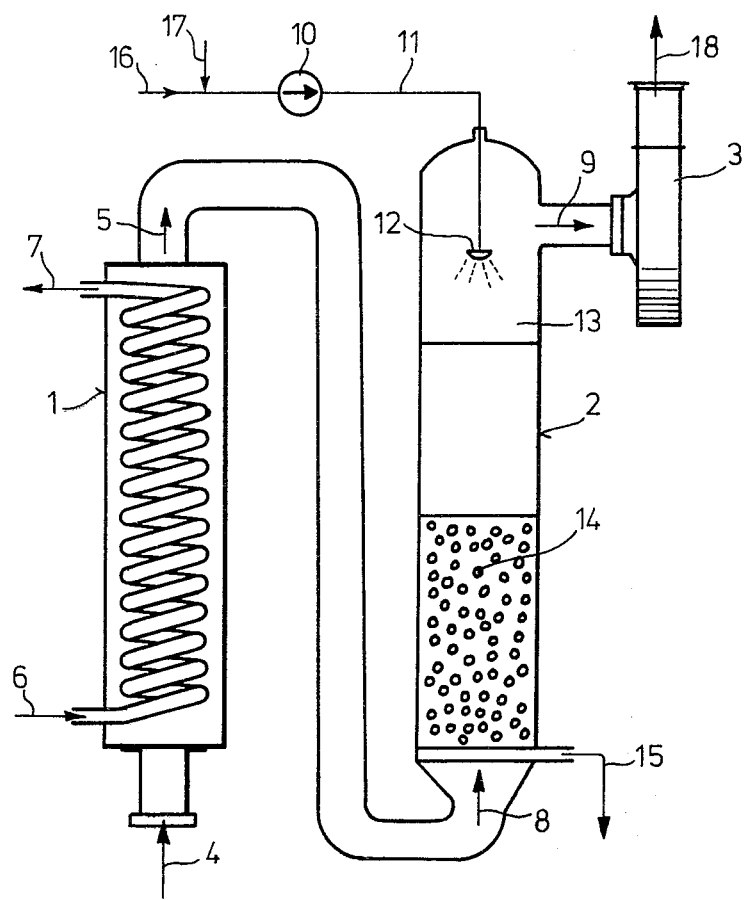

PROCESS FOR ELIMINATING ODOR-EMITTING SUBSTANCES FROM WASTE AIR

Among the efforts which are being made to protect the environment against atmospheric pollution, particular attention has recently been devoted to reducing odour emissions from industrial waste gases. Troublesome and, in some cases, even extremely unpleasant odours are even emitted from numerous factories concerned with industrial food processing, for example breweries, malting houses, coffee roasting plants, fish processing plants, soup seasoning installations and also from factories concerned with the disposal of animal carcasses.

The hitherto proposed methods for eliminating or substantially reducing this emission of odours are in some cases inadequate and in others very expensive.

The odour-emitting substances which accumulate in the malting process during the processing of barley into malt and the equally troublesome odour-emitting substances which are encountered in breweries during preparation of the mash and during boiling of the worts have hitherto generally been simply let off overhead into the atmosphere together with the steam contained in the noxious vapours. In this case, cooling of the noxious vapours (in so-called pan vapour condensers) with a view to recovering heat eliminates at most only about 30% of the odour-emitting substances (mainly the water-soluble odour-emitting substances), while at least 70% of these substances, particularly the strong-smelling troublesome constituents, remain in the waste air.

In other factories, waste air which accumulates along with odour-emitting substances is purified by gas washing, the washing water optionally containing additions of lyes and alkalis. However, this involves the danger of effluent pollution and hence necessitates appropriate neutralization. Other substances used for purification, such as phosphates, also pollute effluent to a considerable extent. Gas washing by means of ozone or chloride of lime is another source of environmental pollution and is additionally attended by the disadvantage of corrosion.

In addition, a variety of adsorption and absorption processes using filters, such as biological filters and active carbon, have been used for eliminating odour-emitting substances. Processes such as these involve considerable outlay when carried out on a commercial scale, especially since the filters are characterized by a high flow resistance.

Finally, it is also known that odour-emitting substances present in waste gases may be eliminated by catalytic post-combustion. However, this process is also unsatisfactory on account of the considerable outlay which it involves.

Accordingly, the object of the present invention is to provide a particularly simple, environmentally acceptable (particularly non-effluent-polluting) process for eliminating odour-emitting substances from waste air (particularly from the installations mentioned at the beginning). To this end, the invention starts out from a process in which the waste air is purified by spraying in washing water.

According to the invention, an addition of
(a) non-ionic compounds, namely
  ($a_1$) partial esters of polyalcohols, such as glycerol monostearates or distearates and oleates, sorbitol monostearate and oleate or
  ($a_2$) ethylene oxide or propylene oxide adducts with fatty acids, fatty alcohols, fatty amines, partial fatty acids of polyhydric alcohols, particularly glycerol and sorbitol, alkyl phenols, water (polyalkylene glycols) or
(b) ampholytic compounds, namely
  ($b_1$) long-chain substituted amino acids, such as N-alkyl-di-(aminoethyl)-glycine, N-alkyl-2-aminopropionate or
  ($b_2$) betaines, such as (3-acylaminopropyl)-dimethyl glycine, alkyl imidazolium betaines or
(c) mixtures of compounds belonging to groups (a) and (b), is made to the washing water.

The compounds mentioned above are surface-active substances which are biodegradable and which may therefore be let off into a treatment plant together with the washing water. The addition of these surface-active substances to the washing water provides the solubility for the odour-emitting substances to be removed. Compounds of group (a) are preferably used in cases where apolar (lipophilic) odour-emitting substances have to be eliminated, whereas an addition of compounds belonging to group (b) or of a mixture of compounds belonging to groups (a) and (b) is the most suitable for eliminating polar odour-emitting substances.

According to the invention, the surface-active substances mentioned above are added to the washing water in a quantity of from 0.1 to 3% by weight and preferably in a quantity of from 0.5 to 1.2% by weight. In this respect, a minimal degree of foaming is essential.

Where a gas washer is used which, at its lower end, comprises a connection to the gas inlet and a connection to the washing water outlet and, at its upper end, a connection to the gas outlet and a sprinkler head for spraying in the washing water, the lower part of the washer housing containing a packing for surface enlargement, the addition to the washing water is gauged in accordance with the invention in such a way that the packing-free head space of the washer housing through which the gases flow is not completely filled with foam.

To obtain optimal elimination of the odour-emitting substances, the waste air is best delivered to the washing zone at a temperature of less than 80° C. in the process according to the invention.

The invention will now be described in more detail with reference to the accompanying drawing, which diagrammatically illustrates an installation for carrying it out, and with the aid of a few Examples.

The drawing only shows the actual washing zone, but not those parts of the installation (for example of a brewery or malting house) in which the waste air laden with odour-emitting substances accumulates.

The washing zone contains a heat exchanger 1, a gas washer 2 and a fan 3. The waste air laden with odour-emitting substances enters the heat exchanger at 4 and leaves it at 5. The cooling medium is introduced at 6 and removed at 7.

At its lower end, the gas washer 2 has an inlet connection and at its upper end an outlet connection for the waste air. The washing water is sprayed into the head space 13 of the gas washer 2 through a sprinkler head 12 via a pipe 11 provided with a pump 10. The lower part of the washer housing contains a packing 14 for enlarging the surface. The washing liquid is run off at 15 in the lowermost part of the washer housing.

The surface-active substance is added to the washing water 16 at 17. The waste air freed from the odour-emitting substances issues from the fan 3 as shown by arrow 18.

The function of a washing zone of the type described above and the technical effect obtained by the addition according to the invention are explained in detail in the following Examples.

EXAMPLE 1 (Brewery)

In this case, the vapours laden with odour-emitting substances accumulate in the various mash and wort coppers, for example in doughing-in vats, mash coppers, mash vats, mash vat coppers, wort coppers with open or closed boiling in the absence of air (for example equipped with internal boilers or external boilers).

As tests have shown, this waste air contains for example the following non-condensible odour-emitting substances:

| Concentration range mg/m$^3$ | Compound |
| --- | --- |
| 5.0–45.0 | myrcene |
| 5.0–45.0 | α-humulene |
| 5.0–45.0 | β-caryophylene |
| 0.2–5.0 | γ-terpinene |
| 0.2–5.0 | α-selinene |
| 0.2–5.0 | β-selinene |
| 0.2–5.0 | α-cadinene |
| 0.2–5.0 | δ-cadinene |
| 0.2–5.0 | isobutyric acid-2-methyl-butyl ester |
| 0.2–5.0 | isobutyric acid-n-pentyl ester |
| 0.2–5.0 | 6-methyl heptanoic acid methyl ester |
| 0.2–5.0 | isobutyl methyl ketone |

An addition of 1% by weight of polyethylene glycol sorbitan laurate (i.e. a compound belonging to group a$_1$) is made to the washing water.

The other process conditions are as follows in two variants of the brewery (open and closed boiling):

| | Open boiling | Closed boiling |
| --- | --- | --- |
| temperature of the vapours before the heat exchanger | approx. 90° C. | approx. 100° C. |
| temperature of the vapours after the heat exchanger | approx. 60.70° C. | approx. 50–60° C. |
| evaporation in % | 8–10% | 10–13% |
| quantity of washing water to be sprayed in per 100 hl (hectolirte) of wort run from the kettle per hour | 24 hl | 30 hl |
| addition (1%) of polyethylene glycol sorbitan laurate | 24 l | 34 l |

The addition according to the invention reduces the proportion of organic odour-emitting substances in the purified waste air to 7.4% (based on the proportion in the vapours). The significant technical advance achieved in this way becomes particularly noticeable by comparing what happens without the addition. In this case, 66% of the total emission of strong-smelling organic substances remains in the residual gas where the sprinkler head for washing water is used. If, in addition, the vapours are not cooled, as much as 85% of the total emission remains in the residual gas.

EXAMPLE 2 (malting house: germination)

The vapours removed from germ boxes of a malting house contain the following odour-emitting substances for example:

| | μg/m$^3$ of waste air per day |
| --- | --- |
| Carbonyls | |
| ispropylmethyl ketone | 27 |
| hexanol | 4.5 |
| tr-2-hexanol | 15 |
| tr-cis-nonadiene-2,6-al | 8.2 |
| tr-tr-decadiene-2,4-al | 2.8 |
| Alcohols | |
| n-hexanol | 703 |
| 1-pentene-3-ol | 27 |
| cis-pentene-3-ol | 19 |
| tr-2-octene-1-ol | 2.8 |
| 2-nonene-1-ol | 6.0 |

The vapours accumulating have a temperature below 20° C. Accordingly, the heat exchanger is left out here.

An addition of 0.5% of an ester of sorbitan with stearic acid is made to the washing water.

The residual gas thus purified only contains 5% of the original total content of odour-emitting organic substances.

EXAMPLE 3 (malting house: kiln-drying)

The waste air from the kilns contains the following odour-emitting substances for example:

| | μg/m$^3$ of waste air per day |
| --- | --- |
| Carbonyls | |
| isopropyl methyl ketone | 400 |
| hexanol | 54 |
| tr-2-hexanol | 182 |
| tr-cis-nonadiene-2,6-al | 96 |
| tr-tr-decadiene-2,4-al | 36 |
| Alcohols | |
| n-hexanol | 4960 |
| 1-pentene-3-ol | 330 |
| cis-pentene-3-ol | 228 |
| tr-2-octene-1-ol | 28 |
| 2-nonene-1-ol | 72 |

Heat is recovered from the waste air of the kiln in the usual way as follows:

| Temperature of the waste air | | |
| --- | --- | --- |
| before the heat exchanger | | |
| during air-drying | 23–35° C. | 12 h |
| during kiln drying | 35–77°C. | 6–8 h |
| after the heat exchanger | | |
| during air-drying | 20–28° C. | 12 h |
| during kiln drying | 28–60° C. | 6–8 h |

An addition of 0.8% of an ester of sorbitan with palmitic acid is made to the washing water. This gives a residual content of 5% of the total emission of odour-emitting organic substances in the purified waste air.

EXAMPLE 4

Fishmeal, train oil and fish oil production

The waste air contains inter alia the following odour-emitting substances:
100 to 200 mg/m$^3$ of amines
100 to 300 mg/m$^3$ of N$_2$-containing compound
10 to 50 mg/m$^3$ of aldehyde After re-cooling, the vapours are delivered to the gas washer at a temperature of 60° C.

The washing water contains an addition of 2% by weight of a mixture of 1% by weight of (3-acylaminopropyl)-dimethyl glycine and 1% by weight of a palmitic acid sorbitan ester reacted with methylene oxide. The waste air purified in this way in the gas washer still contains a residual content of 10% of odour-emitting substances.

EXAMPLE 5 (coffee roasting installation)

The waste air contains inter alia the following odour-emitting constituents:

5 to 10 mg/m$^3$ fo aldehyde
approximately 1 mg/m$^3$ of phenols
approximately 1 mg/m$^3$ of N$_2$- and S-containing components (heterocycles)

After re-cooling, the vapours are delivered to the gas washer at a temperature of the order of 60° C.

The washing water contains an addition of 3% of N-alkyl-di-(aminoethyl)-glycine.

This gas wash eliminates the odour-emitting substances to a residual content of 12%.

We claim:

1. In a process for eliminating odour-emitting substances from the waste air of an industrial process including an apolar odour-emitting substance or a polar odour-emitting substance and wherein the waste air is purified by spraying in washing water, the improvement comprising adding to said washing water prior to spraying at least one compound of the following groups:
   (a) partial esters of polyalcohols; ethylene oxide adducts and propylene oxide adducts with fatty acids, fatty alcohols, fatty amines, or partial fatty acids of polyhydric alcohols;
   (b) long-chain substituted amino acids; or betaines; and
   (c) mixtures of the compounds of groups (a) and (b), the said at least one compound of group (a) being used for eliminating apolar odour-emitting substances, and the said at least one compound of group (b) being used for eliminating polar odour-emitting substances, and spraying the waste air with said washing water containing said at least one compound.

2. A process according to claim 1 including introducing a gas to said washing water and spraying said washing water and said gas simultaneously.

3. The process of claim 1 wherein said compound is added to the wash water in a quantity of from about 0.1 to 3 percent by weight.

4. The process of claim 1 wherein said compound is added to the wash water in a quantity of from about 0.5 to 1.2 percent by weight.

5. The process of claim 1 wherein said waste air is washed at a temperature of less than about 80° C.

* * * * *